March 16, 1965 T. B. ATANASOFF 3,173,534
DIVERTER FOR BELT CONVEYORS HAVING TELESCOPIC LINKAGE
Filed May 23, 1962 2 Sheets-Sheet 1

INVENTOR.
Theodore B. Atanasoff
BY Albert M. Zelkind

United States Patent Office 3,173,534
Patented Mar. 16, 1965

3,173,534
DIVERTER FOR BELT CONVEYORS HAVING TELESCOPIC LINKAGE
Theodore B. Atanasoff, Frederick, Md., assignor to Aerojet-General Corporation, Azusa, Calif., a corporation of Ohio
Filed May 23, 1962, Ser. No. 197,094
12 Claims. (Cl. 198—188)

This invention relates to diverters of the general type shown in the patent application of John V. Atanasoff et al., S.N. 4,322, filed January 23, 1960, now Patent No. 3,033,366.

In the previously cited patent application a diverter mechanism is disclosed having a paddle movable transversely of a conveyor belt, upon signal energization, to push articles off the belt onto or down an auxiliary conveyor or chute. The diverter disclosed in the aforementioned application utilized cam surfaces for effecting a substantially linear motion of the pusher paddle across the face of the belt. The present invention has for its object a mechanism for effecting substantially the same motion without, however, the use of cams or cam surfaces which are subject to wear. More particularly, the present invention is suitable for industrial use under conditions where heavy dust and grit particles may permeate the air and thus lead aggravated abrasive action to wear and tear of the cam surfaces.

It is another object of the invention to provide a mechanism for a diverter of the same simple and rugged construction heretofore disclosed in the previous application and one which will stand up over long periods of use without maintenance problems.

Other objects and features of the invention will be apparent from the description which follows:

Briefly, the invention comprises the usual frame and swinging paddle arrangement utilizing a linkage system actuated by a crank arm to effect substantially linear motion of the paddle in its sweep across the moving conveyor belt. In order to achieve such effect, the electric motor, which is part of the mechanism, is mounted on a pivoted support and connected to the crank arm by a belt and pulley arrangement, the crank arm being likewise journaled on the support so that it can move in a certain restrained path with respect to the remainder of the mechanism. The device encompasses the use of an extensible radius arm of telescopic construction which can afford the paddle an upward component of movement for the span of travel across the belt to give an accurate approximation of straight-line movement as against the natural arcuate movement that the paddle would take, unless compensatingly motivated.

A detailed description of the invention now follows in conjunction with the appended drawing in which.

Figure 1:
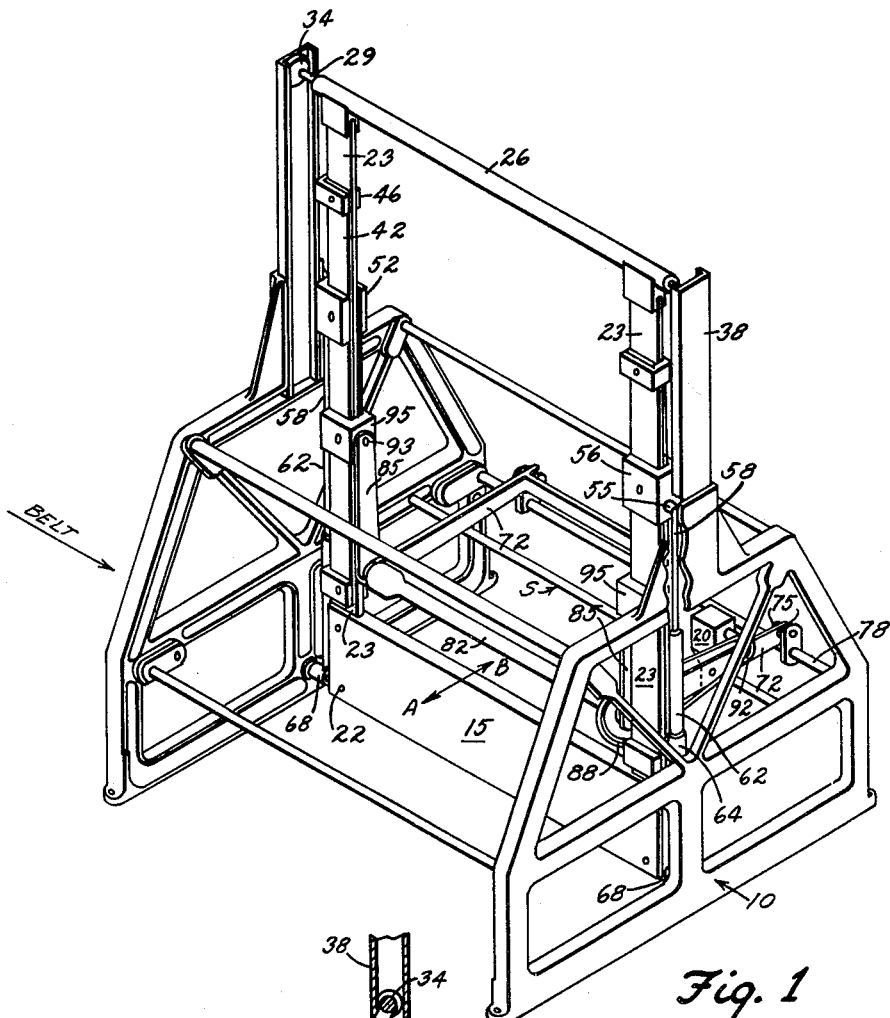
FIG. 1 is a perspective of the diverter mechanism showing all the essential parts; the paddle being in extreme upper position.
Figure 2:
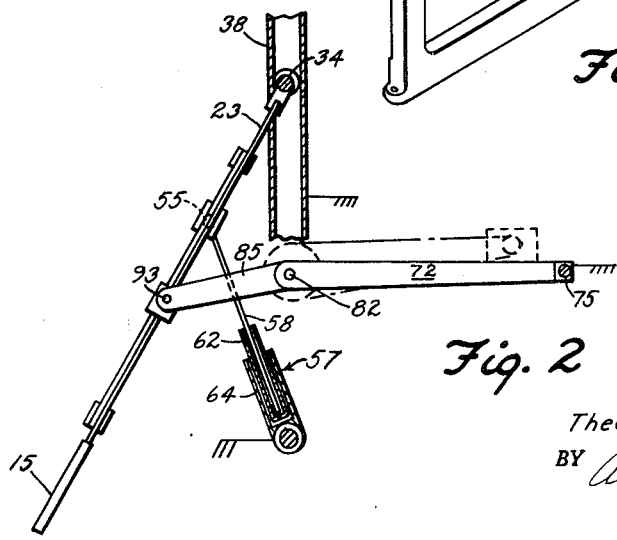
FIG. 2 is a fragmentary illustration showing the positions of the moving parts at one position of the cycle of movement.

Referring now to FIG. 1, a frame 10 is shown which will be understood to be fastenable on a suitable base support (not shown) above and astraddle a conveyor belt (not shown) which moves in the direction of the arrow. A paddle 15 is movably carried by the frame and is actuatable transversely of the direction of the conveyor belt so as to sweep packages or articles, etc., off the belt at either side. Thus, paddle 15 can move in the direction of the arrow A or arrow B, reversibly depending upon the direction of rotation of a motor 20. Such reversibility is provided for by appropriate circuitry (not shown) all in accordance with the previously mentioned patent application.

Paddle 15 is integrally secured as at 22 to a paddle carry means such as steel leaf spring suspension bars 23 which extend upwardly for securement to a rotative sleeve 26 journaled on an axle 29 to the ends of which are fastened bearing wheels or rollers 34 which can ride alternately, depending on whether the paddle is rising or falling, on either flange 35 of channel members 38 integrally secured to the frame 10. A slide block could be used in place of rollers 34.

The bars 23 are stiffened by side bars 42 suitably clamped by U-shaped clamps as at 46 and an encompassing U-shaped bracket 52 is secured to the bars for the purpose of anchoring thereto the upper, pivotal trunnions 55 (one shown) of a telescopic link 57 which comprises a rod 58, a sleeve 62, and a base tube 64 which is pivotally joined to the frame by a trunnion 68 at each side of the swinging paddle mechanism. From the description thus far given, it will be apparent that as the paddle 15 and its integral bars 23 swing about the axis of tube 26, the telescopic arrangement 58, 62, 64 will extend or contract accordingly. However, contraction takes place to a limiting condition whereat the elements 58, 62, 64 bottom against each other to form a solid radius arm which during part of the oscillation of paddle 15 across the belt forces a rise of the suspension bar system as guided in channels 38, thus adding a component of motion to the paddle to convert the naturally arcuate motion to substantially linear motion.

To effect swinging of the paddle an actuating means comprising the motor 20 is mounted on a support means comprising one of two bracket arms 72 trunnioned at 75 to a bar 78 which extends transversely of the frame and is secured thereto. Thus, a bracket arrangement is effected by arms 72 for support of the motor and also for support of a shaft 82 to the ends of which are keyed crank arms 85. Shaft 82 has keyed thereto a pulley 88 belted to motor pulley 92 whereby energization of the motor effects rotation of crank arms 85. The upper ends of the crank arms, as shown in FIG. 1 are journaled at 93 to U-shaped clamps 95 integrally secured to respective paddle suspension bars 23.

From the above description, it will be apparent that when the motor is energized rotation of crank arms 85 will effect swinging of paddle 15 and, depending upon direction of movement of the paddle, the telescopic extension device will extend or contract to a limiting condition to lift the suspension bar system along with the paddle, as well as effecting rocking of the motor mount brackets 72 around shaft 78, along with crank arms 85. Thus, the paddle actuating means is itself supported for compensating movement when the additional component of motion is provided to the paddle as the elements 58, 62, 64 bottom against each other.

The purpose of the linkage, as previously stated, which comprises the telescopic tube devices, the crank arms 85, the bracket arms 72, and the suspension bars 23 is to effect a substantially linear movement of paddle 15 as it sweeps transversely across the belt. This will be explained in conjunction with the schematic and kinematic drawings.

Figure 4:
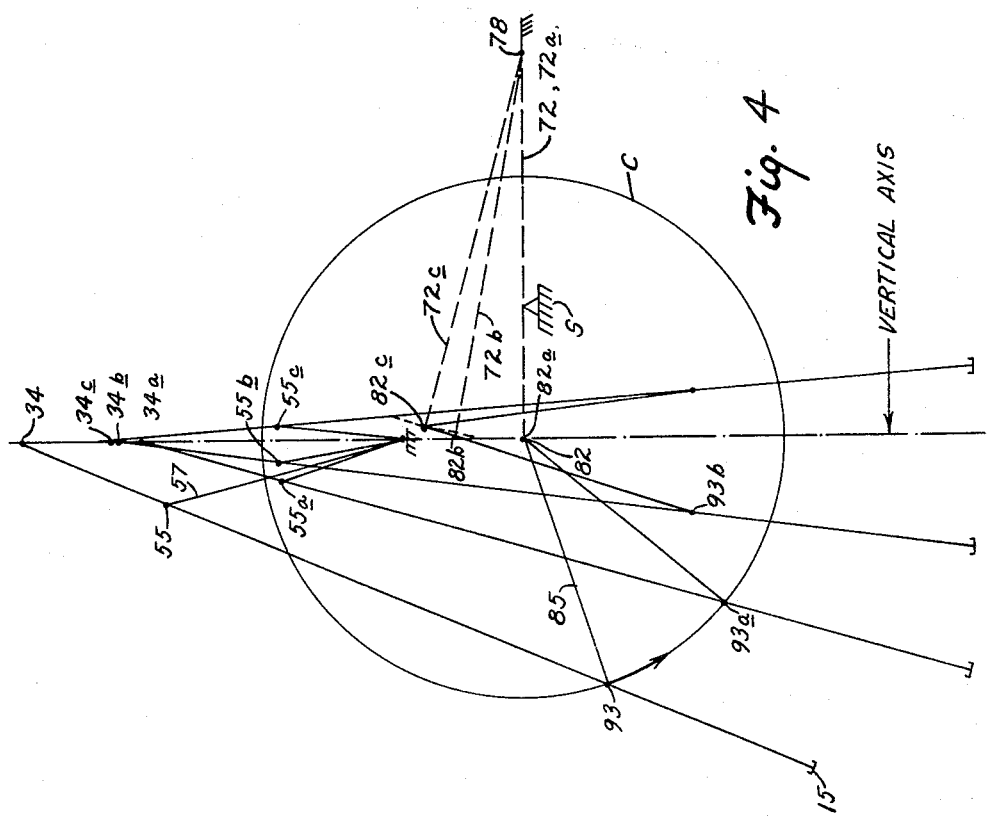
FIG. 4 shows kinematically the operation of the linkage system in various intermediate positions.
Figure 3:
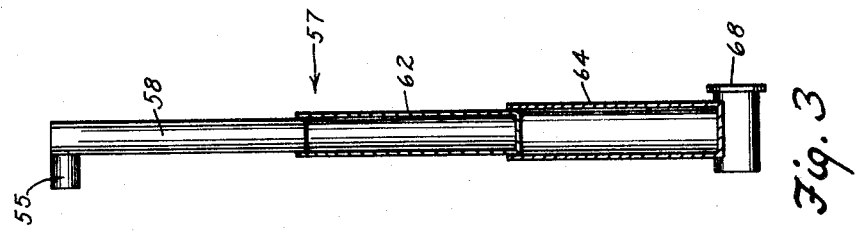
FIG. 3 shows the telescopic linkage, in section, in extended position.

Referring now to FIG. 4 and comparing this with FIG. 1, a kinematic representation is illustrated for all of the components shown in FIG. 1. Thus, the point 82 corresponds to the axis of shaft 82 of FIG. 1 and the crank arm 85 is shown as a link from point 82 to point 93 which is the axis of the pivotal connection between the crank arm and the paddle 15. The suspension for paddle 15 is pivotal at the point 34 corresponding to the center of the slide 34 of FIG. 1.

The telescopic arm 57 connects pivotally at 55 to the paddle and is fixed at point 68 for pivotal support thereat. A stop S shown as a rod on FIG. 1 serves as a rest support for the frame members 72 which carry the motor (not shown in FIG. 4). Thus, the weight of the motor is supported when the mechanism is at its rest position, and also at a particular time after initial movement as indicated by the reference character 72a. Rest stop S further prevents the motor frame from dropping below a horizontal position.

In operation, the paddle is at rest in the uppermost central position with the crank arm 85 vertically upward (as shown in FIG. 1) at this time. Transferring this position to FIG. 4 (the points are not shown in such position thereon) it will be understood that at this time the point 93 is at the top center of the crank arm circle C and point 55 is at the top center of an elliptical path which it is caused to follow by the mechanism. As the crank arm moves counter-clockwise, the frame 72 starting in horizontal position. Point 93 moves on the circle C until the point 93a is reached. At this point the components of the telescopic arm 57 bottom and thus can no longer contract. This prevents any further downward movement of the paddle. Inasmuch as the crank arm continues to rotate but point 93 is restrained against further downward movement, it moves to the point 93b and subsequently to the point 93c. The corresponding condition of the telescopic linkage 57 is shown at points 58a, 58b and 58c, bottomed condition. The motor frame has traveled from 72b to 72c. The sliding pivot 34 has traveled to 34a, thence to 34b and thence to 34c. The elevation of the motor frame 72 is at maximum when the crank arm 85 is approximately vertically downward. For the reason that the point 82 travels in an arc about the point 78, the maximum elevation actually occurs when point 93 is slightly to the right of center and thereafter the elevation decreases until crank arm 85 reaches a position such that point 93a is at its image point on the other side of the vertical axis. At this time the motor frame is again resting on the stop rest S. The points 93 and 95 continue to travel their respective arcs until they reach top dead center of such arcs, at which time motion ceases under suitable electrical control, not shown.

The important feature of the invention is shown in the relationship of the points 93a, 93b and 93c, being on virtually a horizontal straight line, at least for practical purposes, so far as the utility of the invention is concerned. It will, of course, be appreciated that starting from rest position with point 93 at top center of circle C, reverse rotation of crank arm 85 will effect the same motion of the paddle but in the opposite direction. Accordingly, the paddle may sweep a bundle off either side of a moving belt when the device is located so that the paddle in rest position is in a plane in the center of the belt, such plane bisecting the belt longitudinally.

Having thus described my invention, I am aware that various changes may be made without departing from the spirit thereof and, accordingly, I do not seek to be limited to the precise illustrations herein given, except as set forth in the appended claims.

What is claimed is:

1. In a device of the class described, a paddle means, paddle carry means, actuating means for actuating said paddle carry means, a support means for said actuating means, said actuating means being connected to said paddle carry means for effecting movement of said paddle means, extensible linkage means connected to said paddle carry means for adding a predetermined component of motion to said paddle means for a predetermined extent of the movement thereof as effected by said actuating means, said component of motion effecting a substantially straight line movement of said paddle means, and means for guiding said paddle carry means in combined pivotal and linear motion.

2. In a device as set forth in claim 1, said last-name means including a frame means, and said paddle carry means being movably connected to said frame means and guided for combined pivotal and linear movement.

3. In a device of the class described, a paddle means, paddle carry means, actuating means for actuating said paddle carry means, movable support means for said actuating means, said actuating means being connected to said paddle carry means for effecting movement of said paddle means, linkage means connected to said paddle carry means for adding a predetermined component of motion to said paddle means for a predetermined extent of the movement thereof as effected by said actuating means, said actuating means comprising a crank arm, said support means comprising a pivotal bracket, said crank arm being mounted for rotation on said bracket, and means for guiding said paddle carry means in combined pivotal and linear motion.

4. In a device as set forth in claim 3, said actuating means further including a motor carried on said bracket, and means coupling said motor to said crank arm.

5. In a device of the class described, paddle carry means, a paddle carried thereby, actuating means for actuating said paddle carry means, movable support means for said actuating means, said actuating means being connected to said paddle carry means for effecting movement of said paddle, linkage means connected to said paddle carry means for adding a predetermined component of motion to said paddle for a predetermined extent of the movement thereof as effected by said actuating means, said linkage means comprising an extensible device having an end relatively fixed and another end connected to said paddle carry means and movable therewith, said extensible device having a limiting position of minimum length to effect a solid radius arm operative in the course of its motion to provide said additional component of motion to said paddle, and means for guiding said paddle carry means in combined pivotal and linear motion.

6. In a device of the class described, paddle carry means, a paddle carried thereby, actuating means for actuating said paddle carry means, movable support means for said actuating means, said actuating means being connected to said paddle carry means for effecting movement of said paddle, linkage means connected to said paddle carry means for adding a predetermined component of motion to said paddle for a predetermined extent of the movement thereof as effected by said actuating means, said actuating means comprising a crank arm, said support means for said actuating means comprising a pivotal bracket, said crank arm being mounted for rotation on said bracket, said linkage means comprising an extensible device having an end relatively fixed and another end connected to said paddle carry means and movable therewith, said extensible device having a limiting position of minimum length to effect a solid radius arm operative in the course of its motion to provide said additional component of motion to said paddle, and means for guiding said paddle carry means in combined pivotal and linear motion.

7. In a device as set forth in claim 6, said actuating means further including a motor carried on said bracket, and means coupling said motor to said crank arm.

8. In a device of the class described, paddle carry means, a paddle carried thereby, actuating means for actuating said paddle carry means, a support means for said paddle carry means for effecting movement of said paddle, linkage means connected to said paddle carry means for adding a predetermined component of motion to said paddle for a predetermined extent of the movement thereof as effected by said actuating means, said paddle carry means comprising at least one pivotally movable suspension bar, said linkage means comprising an extensible device having a relatively fixed pivotally supported end, and having another end pivotally secured to said suspension bar so as to be movable therewith, said extensible device having a limiting position of minimum length operative to effect a solid radius arm to provide said additional component of motion, and means for guiding said paddle carry means in combined pivotal and linear motion.

9. In a device as set forth in claim 8, said actuating means comprising a crank arm, said support means comprising a pivotal bracket, and said crank arm being mounted for rotation on said bracket.

10. In a device as set forth in claim 9, said actuating means further including a motor carried on said bracket, and means coupling said motor to said crank arm.

11. In a device of the class described, a paddle means, paddle carry means, actuating means for actuating said paddle carry means, a support means for said actuating means, said actuating means being connected to said paddle carry means for effecting movement of said paddle means, linkage means connected to said paddle carry means for adding a predetermined component of motion to said paddle means for a predetermined extent of the movement thereof as effected by said actuating means, said component of motion effecting a substantially straight line movement of an end of said paddle carry means, means including a frame means to which said paddle carry means is movably connected for guiding said paddle carry means in combined pivotal and linear movement, said paddle carry means comprising at least one suspension bar, said linkage means comprising an extensible device having a relatively fixed pivotally supported end, and having another end pivotally secured to said suspension bar so as to be movable therewith, and said extensible device having a limiting position of minimum length operative to effect a solid radius arm to provide a motion restraining effect to said suspension bar whereby an end of said bar has a substantially straight line movement.

12. In a device as set forth in claim 11, said actuating means comprising a crank arm, said support means comprising a pivotal bracket, said crank arm being mounted for rotation on said bracket, said actuating means further including a motor carried on said bracket, and means coupling said motor to said crank arm, said bracket having pivotal support on said frame means.

References Cited in the file of this patent
UNITED STATES PATENTS

| 3,033,366 | Atanasoff | May 8, 1962 |
| 3,044,243 | Wenzel | July 17, 1962 |